United States Patent [19]
Stone

[11] Patent Number: 5,630,265
[45] Date of Patent: May 20, 1997

[54] WINE BARREL RECONDITIONING METHOD AND APPARATUS

[76] Inventor: Christopher S. Stone, 2010 Barlow La., Sebastopol, Calif. 95472

[21] Appl. No.: 342,377

[22] Filed: Nov. 18, 1994

[51] Int. Cl.⁶ .................................. B23P 6/00; B21D 1/00
[52] U.S. Cl. ........................... 29/402.06; 29/402.19; 29/402.21; 147/1; 409/143; 432/224
[58] Field of Search .................. 29/402.04, 402.05, 29/402.06, 402.19, 402.21; 147/1, 14–16, 40–42; 34/104, 108, 437, 440, 441; 432/224; 83/178, 195; 409/143; 219/521, 385, 388

[56] References Cited

U.S. PATENT DOCUMENTS

| 1,126,450 | 1/1915 | Haddigan | 147/1 |
| 1,239,486 | 9/1917 | Highams | 147/1 |
| 2,185,206 | 1/1940 | Little | 432/224 |
| 2,319,582 | 5/1943 | Carroll | 409/143 |
| 2,507,685 | 5/1950 | Wilde | 432/224 |

FOREIGN PATENT DOCUMENTS

| 1437228 | 11/1988 | U.S.S.R. | 147/1 |
| 319562 | 9/1929 | United Kingdom | 147/1 |
| 2166989 | 5/1986 | United Kingdom | 409/143 |

*Primary Examiner*—David P. Bryant
*Attorney, Agent, or Firm*—Larry D. Johnson

[57] ABSTRACT

A method and apparatus for reconditioning wood wine barrels. An open wine barrel is placed on a barrel rotator stand and positioned into a planer-cutter apparatus. Cutting parameters are set, and a horizontal screw advances the cutter into the barrel, cutting a swath the length of the barrel stave. The cutting process is repeated through the number of passes required. The barrel is dried, placed on a toasting rotator stand, and positioned under a toaster so that the toaster elements are inside the barrel. An expansion mechanism places the toaster elements adjacent the barrel interior surface, and the barrel ends are closed. After toasting, the expansion assembly is retracted and the barrel is removed. The barrel heads are run through a planer, dried, and sanded, and placed in a head toaster. The head toaster doors swing closed placing the heads adjacent oscillating firebars.

3 Claims, 8 Drawing Sheets

WINE BARREL RECONDITIONING METHOD AND APPARATUS

BACKGROUND OF THE INVENTION

1. Field of the Invention

This invention relates generally to winemaking methods and apparatus, and more specifically to an improved method and apparatus for reconditioning wood wine barrels.

2. Description of the Prior Art

Fine wines are traditionally aged in oak barrels. The oak is integral to aging and imparting certain flavors to the wines. Wine fermenting and aging in wood barrels extracts flavor components from the wood and leaves a residue of precipitated materials such as tartrates, finning agents or yeast. Wine processing often leaves undesirable bacterial infections in the barrels for which there is no current remedy.

Wine penetrates into a solid barrel stave approximately 3/16 inch. Even over a period of many years, exchange occurs through this depth. Over time, all components which can be extracted from the oak will be, and the residue left in the wood can begin to sour or block the membrane exchange ability of the wood. The barrel is then considered exhausted and is viewed either as a liability because of contamination, or as neutral storage for additional vintages.

The current methods of barrel shaving use bottom cutting routers or rotating wire brushes. These methods, though widely used, are unsuitable for making barrel environments to properly age premium wines. Although inadequate, however, these services remain in business because they are able to remove a small amount of the barrel's inner surface for a very modest fee. Both routers and brushes suffer the same failure. They remove material in a direction perpendicular to the grain of the barrel staves. This shreds the barrel surface and then must be sanded off. The sanding actually causes greater deterioration to the barrel surface because it grinds the exhausted wood into the pores of the newly exposed wood. When this barrel is retoasted, very undesirable "off" flavors are baked into the new surface. Additionally, these processes do not remove enough wood to expose truly new wood, uncontaminated by previous wine.

SUMMARY OF THE INVENTION

This invention provides an improved method and apparatus for reconditioning wood wine barrels. An open wine barrel (i.e., with ends removed) is placed on a barrel rotator stand and positioned into a planer-cutter apparatus, which consists of a motorized cutter head mounted on a carriage and driven along an arm, so that the arm goes through the open barrel. Cutting parameters are set to each barrel's size and configuration, and the operation is automatically controlled via a controller computer module.

The controller's counter is set for the correct number of passes, and the cutting process is started. A horizontal screw advances the cutter carriage down a ramp, dropping the cutter into the barrel. The cutter cuts a swath the length of the barrel stave. At the far end of the cut, the cutter rolls up a ramp, lifting the carriage and cutter up out of the cut. The carriage depresses a limit switch signalling the controller to stop the horizontal screw. With the cutter assembly clear of the wood, the controller causes a rotator motor to rotate the barrel to the next cutting position as signaled by a proximity sensor. The horizontal screw reverses, returning the carriage to its original position. This cutting process is then repeated through the number of passes required to cut and remove the inner surface of the barrel.

When the cutting is complete, the barrel is removed from the rotator stand and placed in a drying chamber. When the barrel's moisture content is reduced to an appropriate level, the barrel is removed from the dryer and moves to the toasting process.

The barrel is placed on a toasting rotator stand. The rotator stand is positioned under a toaster so that the toaster elements are inside the barrel, and the barrel end is engaged with an inner door. With the barrel in place, an expansion mechanism is turned expanding the toaster elements adjacent the barrel interior surface. The toaster outer door is placed and adjusted on the rotator stand so the barrel end is completely closed. A computer controller is started, and the barrel is rotated by a drive mechanism. Once the barrel staves have reached the desired temperature, a timer is started by the controller and this temperature is maintained for the preset amount of time. During the toasting process, a mister sprays a fine water mist into the barrel, driven by an inert gas. At time expiration, the heater assembly is turned off, the outer door is removed, the expansion assembly retracted and the barrel is removed by rolling the rotator stand out from under the toaster. While the barrel is still hot, the inside from the chime to the end of the bowl are coated with food grade paraffin. When cool enough, the barrel is removed from the stand.

The heads, once removed from the barrel, are run through a planer which removes some of the interior surface. Once planed, the heads are dried, and the perimeter surface (croze) is sanded reducing the head diameter allowing for the reduced stave width of the dry barrel. The outside surface of the head is fitted with a strongback with curved ends. This board is stapled to the head and insures the head's alignment during barrel assembly and later when stacked in service. Dry, clean and strong-backed, the head is placed in the head toaster.

The toaster doors are slotted to hold the heads with strongbacks in place. The door closing mechanism is activated by setting a timed switch, and the doors swing closed placing the heads adjacent to a oscillating heater assembly. A motor drives a wheel with an offset drive pin which raises and lowers the heater assembly frame. The moving heater assembly enables the head surface to receive an even toast. The heater assembly surface temperature is read and controlled by a temperature controller. The top of the head toaster is fitted with a misting chamber. A water mister is attached to the side of the chamber and sprays a fine mist into a downward directed stream of inert gas. The gas stream provides moisture to enhance the extractable components created in the oak during toasting. When the preset time has expired, the timer activates a solenoid which opens the toaster doors. The heads are removed and while still warm, hot paraffin is applied to the croze edge and all exposed end grain around the edge of the head. Once cool, the heads are placed back into the barrel and all hoops are tightened by coopers. The barrels soundness is tested with water and air pressure held in the barrel to test for leaks.

This process restores oak wine barrels to 90+% of the quality and wine aging ability they had when new.

DETAILED DESCRIPTION OF A PREFERRED EMBODIMENT

Figure 1:
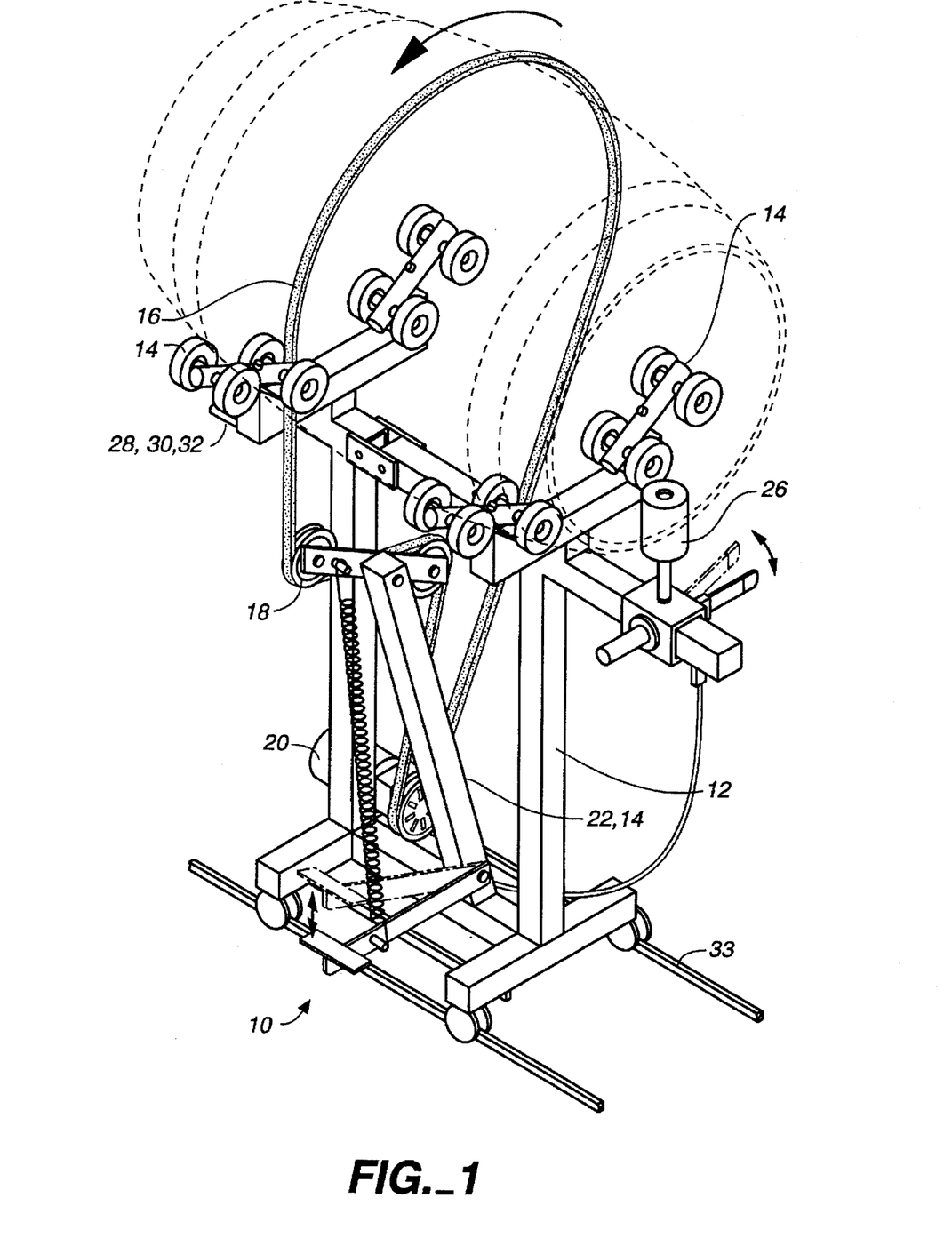
FIG. 1 is a perspective view of a barrel rotator stand of the wine barrel reconditioning apparatus of this invention.
Figure 1A:
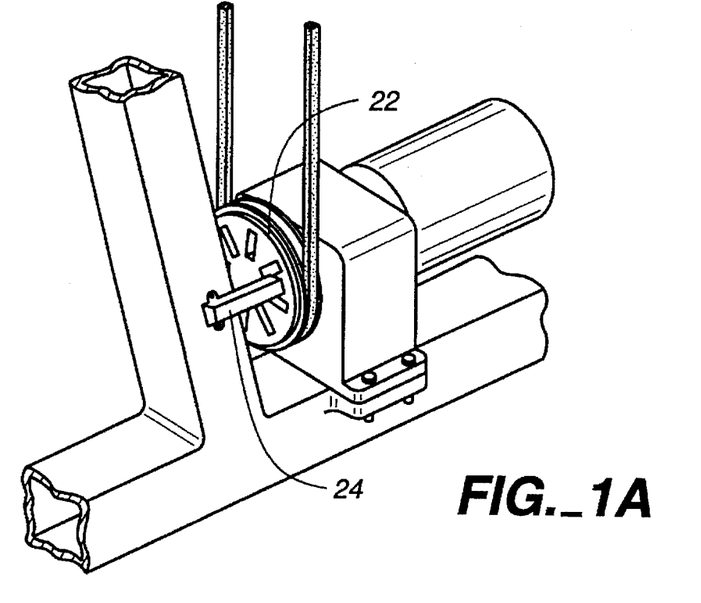
FIG. 1A is a cutaway perspective view of the indicator wheel and proximity sensor of the barrel rotator stand of FIG. 1.
Figure 1B:
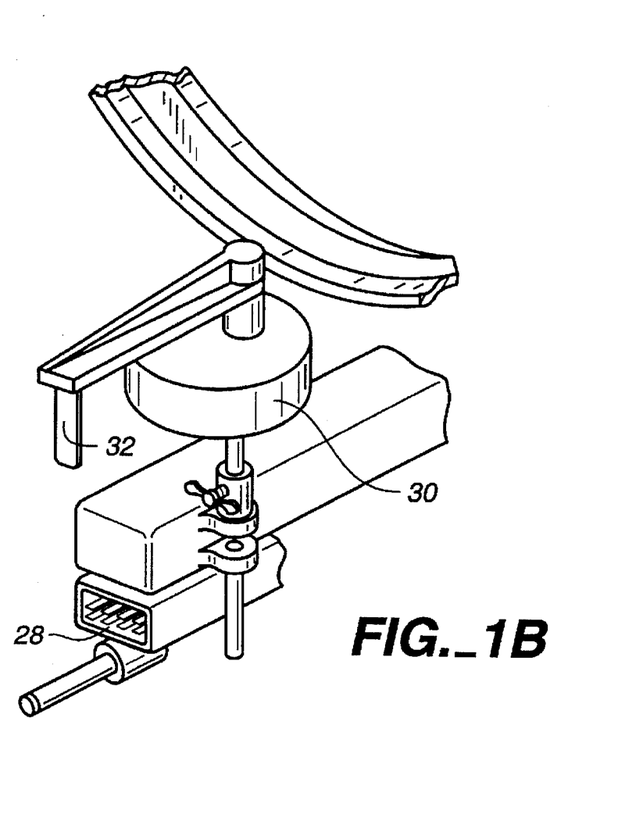
FIG. 1B is a cutaway perspective view of the pin connector, barrel-end roller adjustment assembly, and croze position indicator of the barrel rotator stand of FIG. 1.

FIG. 1 is a perspective view of a barrel rotator stand of the wine barrel reconditioning apparatus of this invention, while FIG. 1A is a cutaway perspective view of the indicator wheel and proximity sensor, and FIG. 1B is a cutaway perspective view of the pin connector, barrel-end roller adjustment assembly, and croze position indicator.

The components of the rotator stand 10 include:

a metal frame 12 of 2"×2" steel square tube;

four roller barrel supports 14 mounted in a free floating manner;

136" V-belt 16;

belt tightening idler wheel assembly 18;

drive motor 20 with drive pulley;

indicator wheel 22 with rotation incrementing magnets;

proximity sensor 24;

barrel-end roller adjustment assembly 26 (outer end);

pin connector 28;

barrel-end roller adjustment assembly 30 (inner end); and croze position indicator 32.

The first step in the process is to remove both heads (ends) from the barrel. The barrel is then placed on rotator stand 10. The barrel rests on four floating roller assemblies 14. The floating rollers give support to any of the infinitely variable barrel shapes and curves. The barrel is centered on the rotator and held in place by rollers 26 and 30. The Croze indicator 32 is adjusted to proper Croze position. Belt 16 is placed over the barrel and tightened with idler wheels 18. With everything in place, the rotator stand is located on track 33 and pushed into the planer-cutter (FIG. 2).

Figure 2:
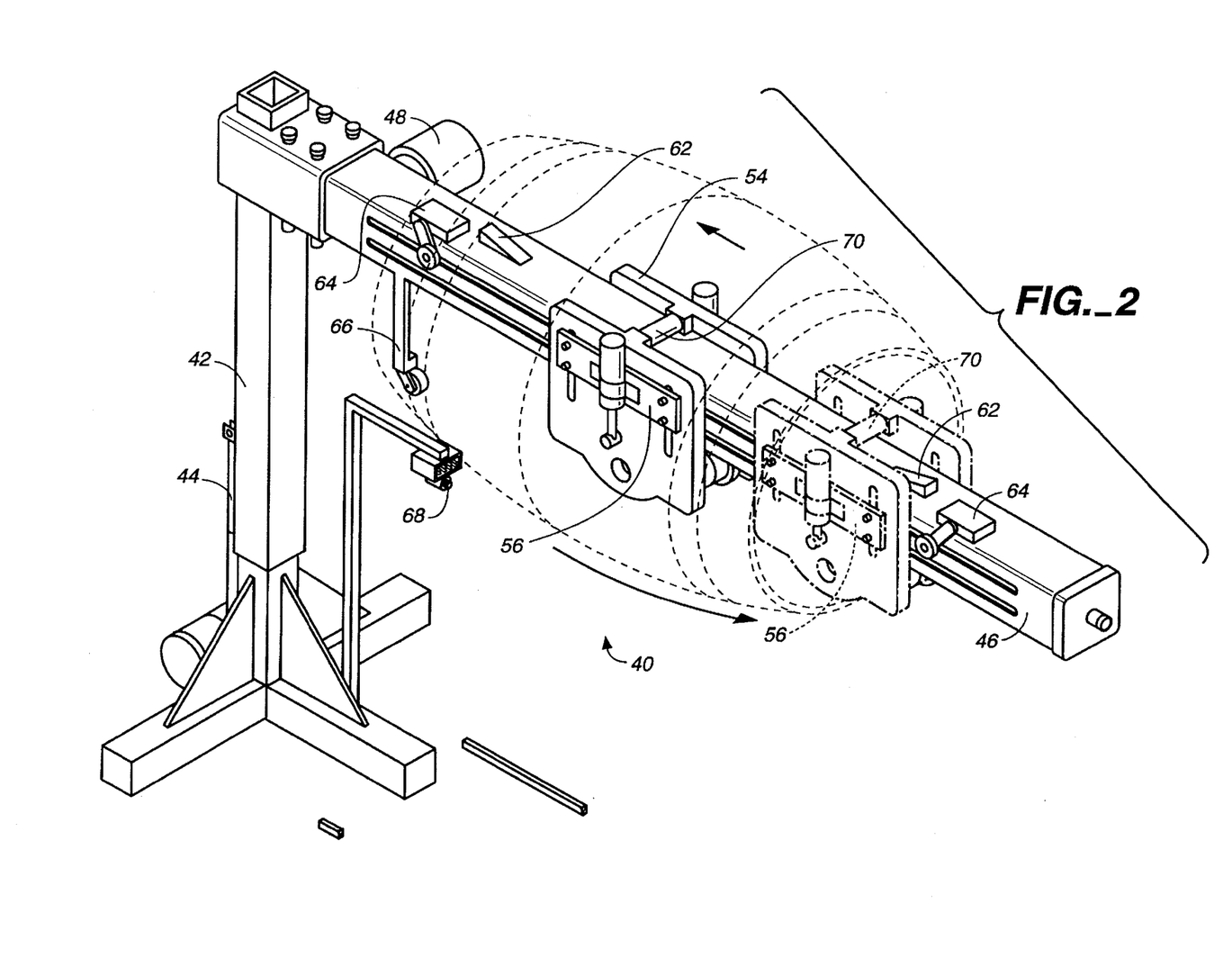
FIG. 2 is a perspective view of a barrel planer-cutter of the wine barrel reconditioning apparatus of this invention.
Figures 2A, 2B:
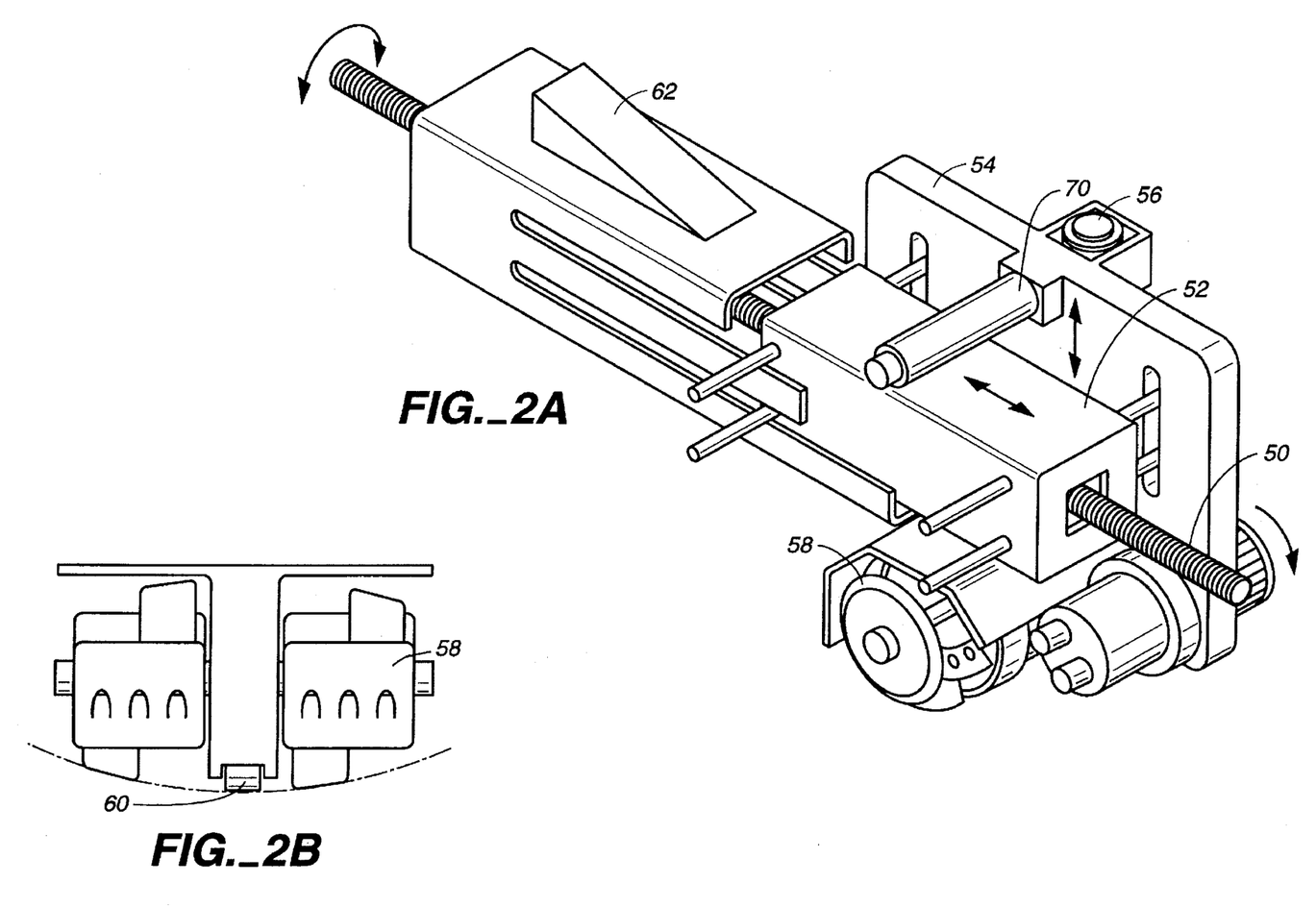
FIG. 2A is a perspective view of the drive carriage assembly of the barrel planer-cutter of FIG. 2.
FIG. 2B is a perspective view of the cutter head drum and cutting depth gauge of the drive carriage assembly of FIG. 2A.

FIG. 2 is a perspective view of a barrel planer-cutter of the wine barrel reconditioning apparatus of this invention, while FIG. 2A is a perspective view of the drive carriage assembly, and FIG. 2B is a perspective view of the cutter head drum and cutting depth gauge.

The components of the barrel planer 40 include:

planer stand 42, a two part steel tube with braced stand which is affixed to the floor. The outer part of the stand telescopes over the inner part;

vertical screw drive assembly 44 which raises or lowers cutter arm;

cutter traverse arm 46, an 8" steel square tube which supports and houses all cutting and traversing assemblies;

horizontal drive screw motor and angle drive speed reducer 48, which provides power to the horizontal drive screw;

horizontal drive screw 50, the motivator for traversing the cutter carriage assembly up and down the cutter arm;

inner drive carriage and driven nut 52, which transfers the drive from the horizontal screw to the cutter carriage;

cutter carriage assembly 54, consisting of steel plates with machines slots and openings to hold the raising and lowering mechanism, and holds the hydraulic motor, cutter drum and refuse evacuation orifice;

pneumatic cylinders and mounting plate 56, including a steel plate mounted on long pins which extend through the cutter carriage, the cutter arm and the drive carriage. These pins carry the drive force from the driven carriage to the cutter carriage. The pneumatic cylinders raise the cutter carriage;

hydraulic motor and cutter drum with knives 58. The hydraulic motor belt drives the split drum which holds the knives. The knives are ground to approximate the barrel curvature and are mounted in a staggered manner to limit the width of cut at any one time. The split drum configuration allows a depth gauge to be placed in the middle of the blades;

cutting depth gauge 60 mounts on the cutter carriage assembly near the center of the cutter drum, and holds a small wheel which rides on the barrel surface. The knives are adjusted to the depth gauge;

end of cut ramp 62 raises the cutter assembly so the cutters are disengaged from the barrel surface at the end of the cut;

end of cut limit switch 64, which is adjustable to the barrel length so that the cutter carriage depresses the switch at the end of the cut signaling to the controller that a pass has been completed;

arm down limit switch 66 signals that the arm is lowered enough to effectively cut the barrel;

pin connector 68 receives the pin connecter on the rotator stand when the stand is in place, and provides the electrical supply for the rotator motor and data feed to the controller (e.g., amount of barrel rotation, stand in place, etc.); and cutter carriage position roller 70 rolls up the ramp at the end of the cut to raise the cutter out of the barrel.

The planer-cutter 40 consists of an arm 46 mounted on a pedestal 42. A carriage assembly 52 is driven along arm 46 by screw 50. A cutter head drum 58 with knives is mounted on carriage 54. The rotator (FIG.1) is positioned on the cutter-planer track 33 so that the arm 46 goes through the open barrel. The rotator pin connecter 28 (FIG. 1) is engaged with the cutter pin connecter 68 (FIG. 2). All cutting parameters such as end of cut ramps 62 and limit switches 64, 66 are set to each barrel's size and configuration. The cutter motor is started, turning the drum 58 with knives adjusted to preserve the barrels curvature. The cutting depth gauge 60 is adjusted to permit a cutting depth of one quarter inch.

With all adjustments made, the controller's counter is set for the correct number of passes and the cutting process is started. The horizontal screw 48 starts, advancing the drive carriage 52. The drive carriage propels the cutter carriage 54. The cutter carriage roller 70 rolls down the ramp 62 dropping the cutter 58 into the barrel. The cutter 58 cuts a 2" swath the length of the barrel stave. At the far end of the cut, roller 70 rolls up ramp 62 lifting carriage 54 up out of the cut. The carriage 54 depresses limit switch 64 signalling the controller to stop the horizontal screw 48. With the cutter assembly clear of the wood, the controller causes the rotator motor 20 (FIG. 1) to rotate the barrel to the next cutting position as signaled to proximity sensor 24 (FIG. 1) by magnets on indicator wheel 22 (FIG. 1). The horizontal screw reverses, returning the carriage to its original position. This cutting process is repeated through the number of passes the counter was set for.

When the cutting is complete, the barrel is removed from the rotator stand and placed in the drying chamber. The dryer blows warm air through the barrel picking up moisture from the barrel surface. When the barrel's moisture content is reduced to 12%, the barrel is removed from the dryer and moves to the toasting process.

Figure 3:
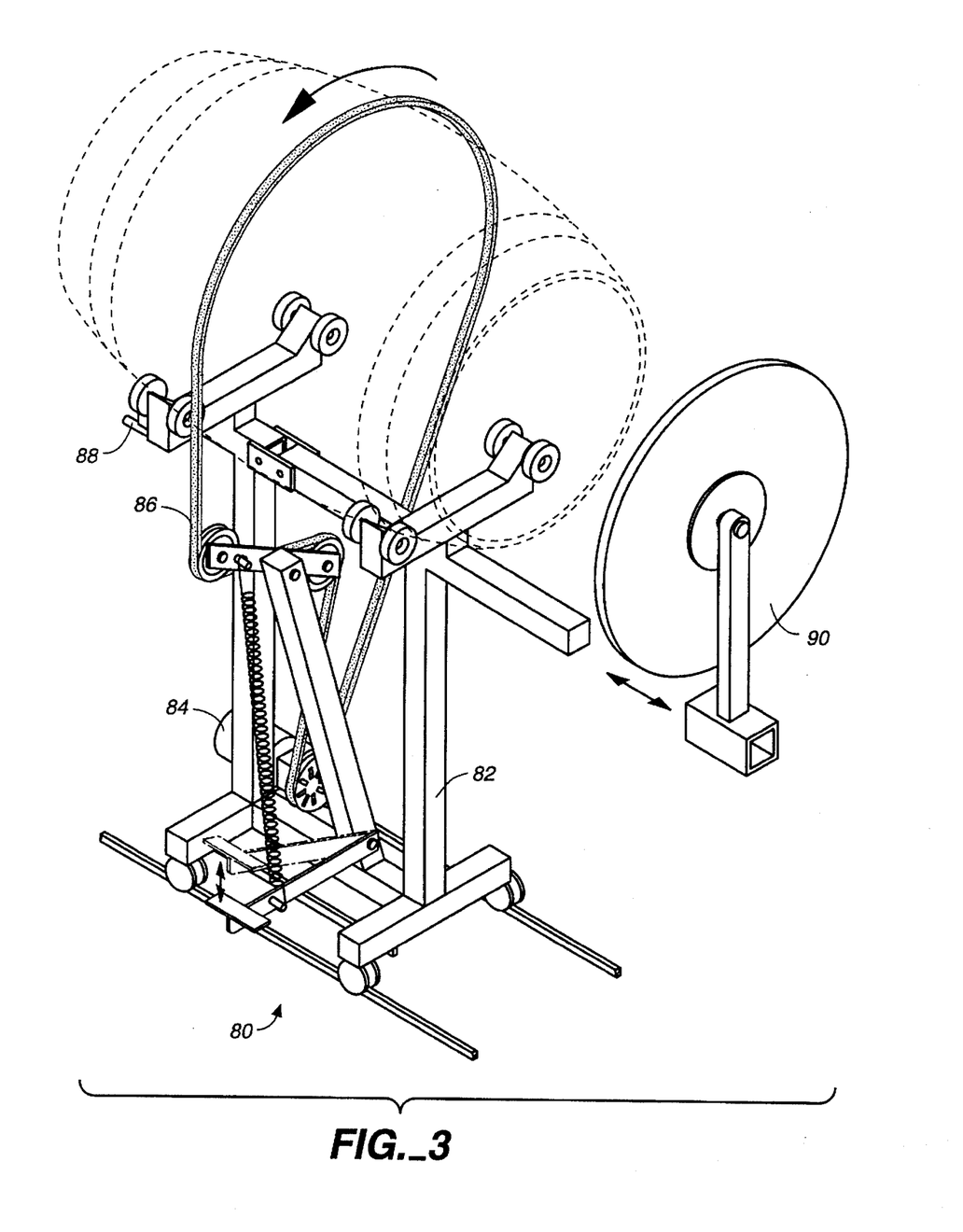
FIG. 3 is a perspective view of a toaster rotator of the wine barrel reconditioning apparatus of this invention.

FIG. 3 is a perspective view of a toaster rotator of the wine barrel reconditioning apparatus of this invention. Toaster rotator 80 includes:

frame with wheels 82, a steel square tube frame with four rolling wheels and four barrel support wheels that the barrel can rotate on;

rotator drive motor 84, a 6 RPM gear-motor which drives the belt that rotates the barrel;

drive belt and tension assembly 86, a 136" V-drive belt, which runs around the barrel, drive wheel and belt tension assembly. Belt tension assembly keeps the belt tight around the barrel allowing consistent rotation;

pin connecter 88 plugs into its mate on the toaster, and provides an electricity source for the rotator motor;

toaster outer door 90 slides on the rotator stand frame and seals on the end of the barrel.

Figure 4:
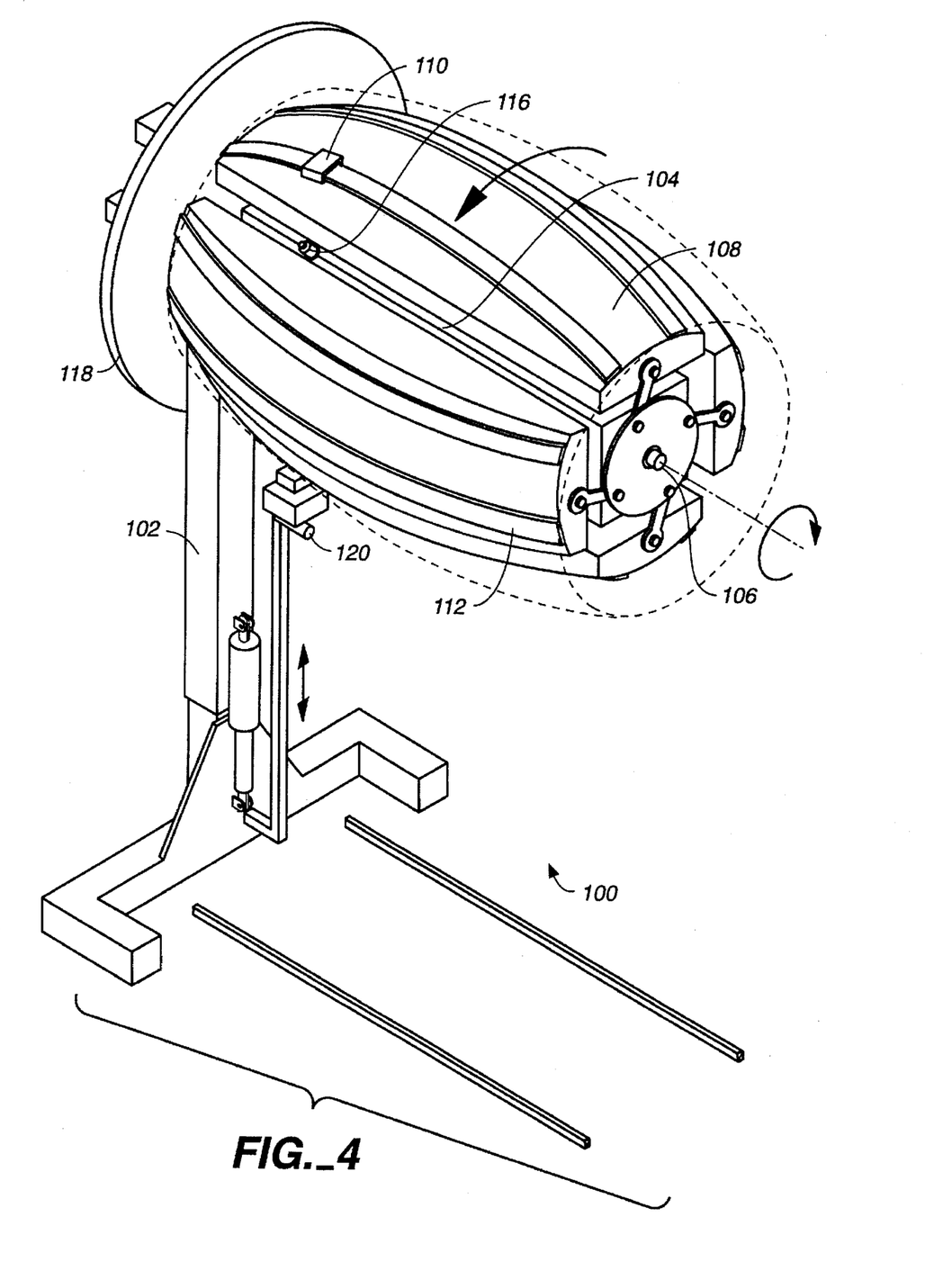
FIG. 4 is a perspective view of a barrel toaster of the wine barrel reconditioning apparatus of this invention.
Figure 4A:
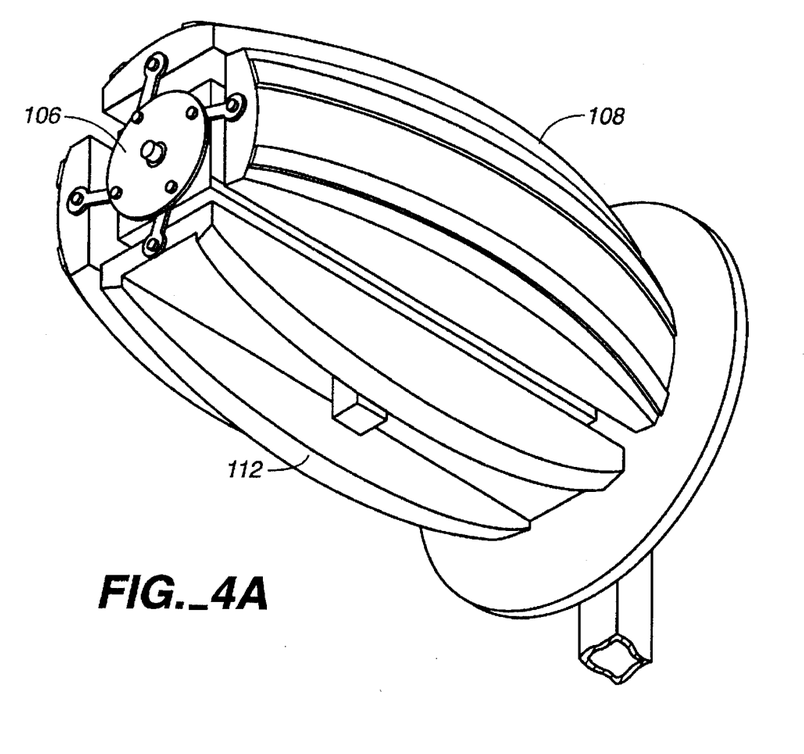
FIG. 4A is a perspective view of the infrared sensor of the barrel toaster of FIG. 4.
Figure 4B:
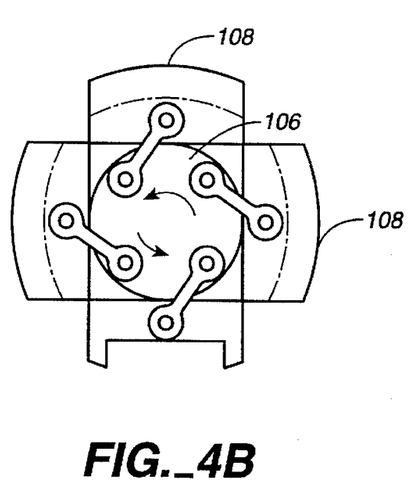
FIG. 4B is a perspective view of the expansion mechanism and toaster elements of the barrel toaster of FIG. 4 in their contracted (radially inward) configuration.
Figure 4C:
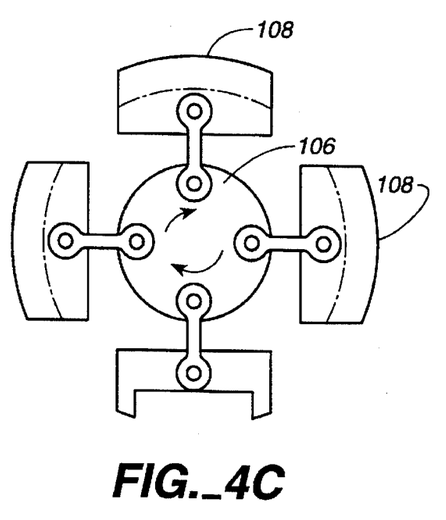
FIG. 4C is a perspective view of the expansion mechanism and toaster elements of the barrel toaster of FIG. 4 in their expanded (radially outward) configuration.

FIG. 4 is a perspective view of a barrel toaster of the wine barrel reconditioning apparatus of this invention, while FIG. 4A is a perspective view of the infrared sensor, FIG. 4B is a perspective view of the expansion mechanism and toaster elements in their contracted (radially inward) configuration, and FIG. 4C is a perspective view of the expansion mechanism and toaster elements in their expanded (radially outward) configuration. Barrel toaster 100 includes:

telescoping stand 102, a steel tube and I-beam stand with a telescoping steel outer part. Braced legs attach to the floor;

toaster support arm 104, a steel square tube arm mounted to the top of the telescoping stand, and holds the castable refractory and firebar expansion mechanism;

expansion mechanism 106, configured so that when the nut is rotated, the arms force castable refractory bricks out toward the barrel inner surface;

firebars and castable refractory bricks 108. Firebars are electric resistance heater strips with surface heat of 1100 degrees F. sustainable. Castable refractory bricks retain the heat and help preheat the barrels;

thermocouple probe 110, type J thermocouple read by the heat controller, which keeps the firebar surface temperature in a preset heat range;

IR sensor and support mechanism 112, mounted in a water-cooled housing, reads the barrel surface temperature through a nitrogen filled tube;

temperature controllers (not illustrated). Two programmable temperature controllers reading J type thermocouples govern the toasting heat ranges. One reads the firebar surface temperature, turning the power on or off to maintain a preset temperature. The other reads the IR sensor, controlling the power to maintain a preset stave surface temperature. A timer is activated once the target temperature is reached. After a preset interval, an alarm signals that toasting is completed;

mister spray assembly 116. A cool mist of water and Nitrogen gas is sprayed through an atomizing nozzle during the toasting process;

toaster inner door 118 fits against the end of the barrel and turns as the barrel rotates, maintaining a semi-sealed environment;

pin connecter 120 receives the pin connecter from the rotator stand;

The barrel is placed on the toasting rotator stand 80 (FIG. 3), and centered and secured with drive belt 86 (FIG. 3). The rotator stand is positioned under the toaster 100 (FIG. 4) so that the toaster elements 108 (FIG. 4) are inside the barrel and the rotator pin connecter 88 (FIG. 3) is engaged with the toaster pin connecter 120 (FIG. 4), and the barrel end is engaged with the inner door 118 (FIG. 4). With the barrel in place, the expansion nut 106 (FIG. 4) is turned expanding the toaster elements 108, castable refractory bricks with firebars attached. The firebar surface is placed approximately one inch from the barrel interior surface. The toaster outer door 90 (FIG. 3) is placed and adjusted on the rotator stand so the barrel end is completely closed. All things in place, the controller is started, and the barrel is rotated at 1RPM by the drive mechanism 84, 86. The firebars are controlled by two Omega temperature controllers. One controller reads the firebar surface temperature through a type J thermocouple, limiting maximum sheath temperature to 540 degrees C. The second controller reads the barrel interior stave temperature through an infrared (IR) sensor 112 (FIG. 4A). Once the barrel staves have reached the desired temperature, a timer is started by the controller and this temperature is maintained for the preset amount of time. During the toasting process, a mister 116 (FIG. 4) sprays a fine water mist into the barrel, which is propelled by Nitrogen gas to reduce the Oxygen concentration. At time expiration, the firebars are turned off, the outer door is removed, the expansion assembly is retracted and the barrel is removed by rolling the rotator stand out from under the toaster. While the barrel is still hot, the inside from the chime to the end of the bowl are coated with 180 degrees Aristawax food grade paraffin. When cool enough, the barrel is removed from the stand.

The heads, once removed from the barrel, are run through a 24" planer which removes ¼" of the interior surface. Once planed, the heads are dried to a moisture content of 12%. When dry, the croze surface is sanded reducing the head diameter approximately 1/16" allowing for the reduced stave width of the dry barrel. The outside surface of the head is fitted with a ½"×6" clear dry fir strongback with curved ends. This board is stapled to the head and insures the head's alignment during barrel assembly and later when stacked in service. Dry, clean and strong-backed, the head is placed in the head toaster (FIG. 5).

Figure 5:
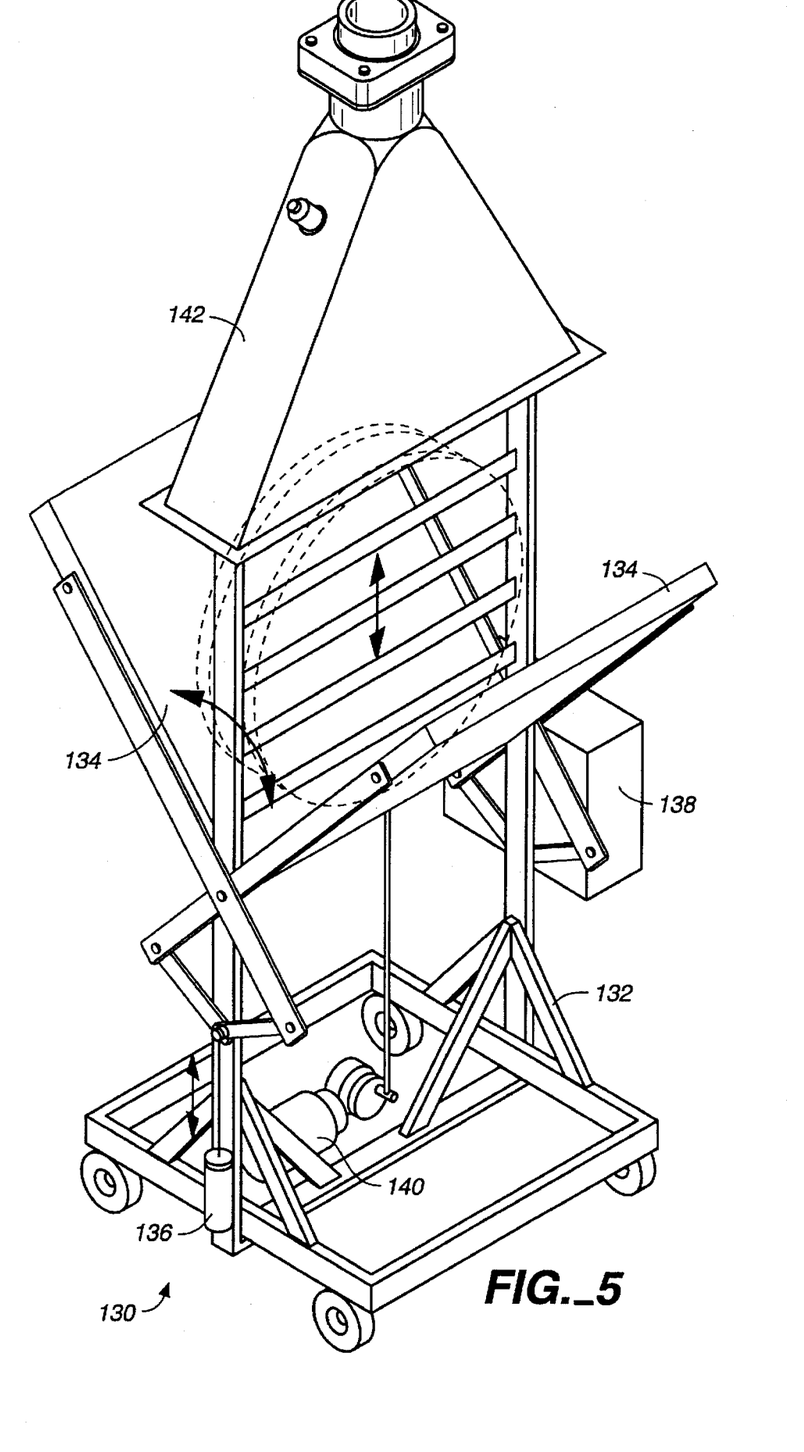
FIG. 5 is a perspective view of a head toaster of the wine barrel reconditioning apparatus of this invention.

FIG. 5 is a perspective view of a head toaster of the wine barrel reconditioning apparatus of this invention. Head toaster 130 includes:

base frame with wheels 132, a welded steel frame with upright arms, and wheels for mobilization;

toaster doors 134, steel doors with slots to secure the barrel heads;

door closing mechanism 136, a pneumatic cylinder with steel straps, which closes the toaster doors with heads inserted when so activated by a timer;

control box 138 consists of temperature control and timer. Temperature control regulates the firebar heater's surface temperature by reading a thermocouple attached to the firebar surface. The timer controls the process by turning it on and off;

drive motor and firebar assembly 140. Firebars are mounted on a frame which slides up and down between the toasting heads. The drive motor activates a rod which pushes the frame; and misting chamber 142. Hot humid air (caused by cool mist spraying water mist into the chamber side) is forced down by a fan on the chamber top, to raise the humidity as the heads are toasting.

The toaster doors 134 are slotted to hold the heads with strongbacks in place. The door closing mechanism is activated by setting a timed switch located on the control box 138. The doors swing closed placing the heads approximately 1" from the oscillating firebars 140.

The drive motor is a gear-motor with a 15 RPM output. The output shaft drives a 2" wheel with an offset drive pin which raises and lowers the attached drive shaft raising and lowering the firebar frame 2". The moving firebars enable the head surface to receive an even toast. The firebar surface temperature is read and controlled by a temperature controller 138 which reads an attached type J thermocouple.

The top of the head toaster is fitted with a sheet metal misting chamber 142. A water mister is attached to the side of the chamber and sprays a fine mist into a downward directed stream of air provided by a muffin fan located at the top of the chamber. The air stream provides moisture to enhance the extractable components created in the oak during toasting.

When the preset time has expired, the timer activates the solenoid which exhausts the pneumatic cylinders and the toaster doors open. The heads are removed and while still warm, hot paraffin is applied to the croze edge and all exposed end grain around the edge of the head.

Once cool, the heads are placed back into the barrel and all hoops are tightened by coopers. The barrels soundness is tested with water and air pressure is held in the barrel to test for leaks.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A method for reconditioning wood wine barrels having a pair of ends including barrel heads and an inside surface, said method comprising the steps of:

placing an open wine barrel with heads removed on a barrel rotator stand;

cutting said wine barrel inside surface by positioning a planer-cutter apparatus into one end of said open wine barrel, setting cutting parameters into a control device in the planer-cutter apparatus, advancing the planer-cutter apparatus into said wine barrel, cutting a linear swath the length of said wine barrel to remove a portion of the wine barrel inside surface, rotating said wine barrel, and repeating the cutting and rotating steps for the number of swaths required to cut and remove a desired amount of said wine barrel inside surface.

2. The method for reconditioning wood wine barrels of claim 1 further comprising the steps of:

removing said wine barrel from said barrel rotator stand;

placing said wine barrel on a toasting rotator stand, positioning said wine barrel adjacent a barrel toaster so that expandable and retractable toaster elements are inside said wine barrel, expanding said toaster elements adjacent said wine barrel inside cut surface, and toasting said wine barrel inside cut surface; and retracting said toaster elements and removing said wine barrel from said barrel rotator stand.

3. The method for reconditioning wood wine barrels of claim 1 further comprising the steps of:

planing, drying, and sanding said wine barrel heads removed from said wine barrel; and placing said barrel heads in a head toaster apparatus having toaster doors adapted to swing closed placing said heads adjacent oscillating firebars.

* * * * *